United States Patent [19]

Endou et al.

[11] Patent Number: 5,128,795
[45] Date of Patent: Jul. 7, 1992

[54] SCANNING LENS AND SCANNING APPARATUS USING SCANNING LENS

[75] Inventors: Osamu Endou, Kawasaki; Nobuo Sakuma, Inagi, both of Japan

[73] Assignee: Ricoh Company, Ltd., Tokyo, Japan

[21] Appl. No.: 566,165

[22] Filed: Aug. 10, 1990

[30] Foreign Application Priority Data

| Aug. 14, 1989 | [JP] | Japan | 1-209837 |
| Nov. 22, 1989 | [JP] | Japan | 1-304330 |
| Nov. 22, 1989 | [JP] | Japan | 1-304331 |
| May 29, 1990 | [JP] | Japan | 2-138831 |

[51] Int. Cl.$^5$ .................. G02B 26/08; G02B 3/00
[52] U.S. Cl. .................. 359/207; 359/205; 359/664
[58] Field of Search .................. 350/6.1–6.91, 350/412–429; 250/234–236; 359/196–197, 205–207, 662–664, 642

[56] References Cited

U.S. PATENT DOCUMENTS

| 4,352,541 | 10/1982 | Minoura et al. | 350/416 |
| 4,571,035 | 2/1986 | Sakuma | 350/6.8 |
| 4,934,772 | 6/1990 | Sakuma et al. | 350/412 |
| 4,962,982 | 10/1990 | Takanashi | 350/6.5 |
| 4,971,411 | 11/1990 | Takanashi | 350/6.5 |

FOREIGN PATENT DOCUMENTS

302217 12/1989 Japan.

Primary Examiner—Bruce Y. Arnold
Assistant Examiner—Thong Nguyen
Attorney, Agent, or Firm—Cooper & Dunham

[57] ABSTRACT

A scanning apparatus comprises a light source for emitting a light along an optical axis, a focusing lens for converting the light emitted from the light source into a convergent light, a deflector for deflecting the convergent light from the focusing lens so that a deflected light is scanned at a substantially uniform angular velocity on an image surface, the deflector having a deflection surface on which the convergent light is deflected, and a scanning lens for focusing the deflected light from the deflector so that a focused light is scanned on the image surface in a main scanning direction to form scanning spots thereon at a substantially uniform scanning rate, the scanning lens being made of a material with a refractive index n and constructed as a single lens having a focal length f. The scanning lens according to the present invention provides a well corrected curvature of field in the main scanning direction and at the same time a good scanning linearity.

12 Claims, 5 Drawing Sheets

SCANNING LENS AND SCANNING APPARATUS USING SCANNING LENS

BACKGROUND OF THE INVENTION

The present invention generally relates to scanning lenses as well as scanning apparatus using a scanning lens, and more particularly to a scanning lens as well as a scanning apparatus using the scanning lens which may be applied to laser printers, digital copiers, laser facsimiles and the like.

A conventional scanning apparatus in which a beam of light is deflected by a deflector unit and the deflected light is scanned over, for example, a surface of a photosensitive body, has been widely applied to the laser beam printers, the digital copiers, or the laser facsimiles. In such a scanning apparatus, a scanning lens, or an $f\theta$ lens, is used for focusing the light being deflected by the deflector unit onto the surface of the photosensitive body as scanning spots or picture elements to form an electrostatic image on the surface of the photosensitive body. There are several proposed types of conventional $f\theta$ lenses. One of those conventional $f\theta$ lenses is designed to carry out an approximate $f\theta$ function and is constructed as a single lens, as disclosed, for example, in Japanese Patent Application No.62-304737 which is one of the priority documents of commonly owned U.S. Pat. No. 4,934,772. This conventional $f\theta$ lens performs a wide range scanning, but there is a tradeoff between a scanning linearity and a correction of curvature of field. That is, as the scanning linearity becomes better, the curvature of field becomes worse to a level that cannot be corrected by electric signal processing sufficiently, and it is difficult for the conventional $f\theta$ lens to provide a high density of the scanning spots.

SUMMARY OF THE INVENTION

Accordingly, it is a general object of the present invention to provide a novel and useful scanning lens as well as scanning apparatus using the scanning lens in which the above described problems are eliminated.

Another and more specific object of the present invention is to provide a scanning apparatus which comprises a light source for emitting a light along an optical axis, a focusing lens for converting the light emitted from the light source into a convergent light, a deflector for deflecting the convergent light from the focusing lens so that a deflected light is scanned at a substantially uniform angular velocity on an image surface, the deflector having a deflection surface on which the convergent light is deflected, and a scanning lens for focusing the deflected light from the deflector so that a focused light is scanned on the image surface in a main scanning direction to form scanning spots thereon at a substantially uniform scanning rate, the scanning lens being made of a material with a refractive index n and constructed as a single lens having a focal length f, the scanning lens comprising a first surface with a first radius R1 of curvature and a second surface with a second radius R2 of curvature, a first relationship between the first radius R1 and the second radius R2 being represented by geometrical conditions of R1>0 and $R_1 < |R_2|$, the focusing lens having a first focal length s measured from a front principal point of the scanning lens to a first image surface, the scanning lens having an entrance pupil distance t measured from the first principal point to the deflection surface of the deflector, a second relationship between the focal length f, the refractive index n, the first focal length s and the entrance pupil distance t being represented by these formulas: $-8.0 < (nf/t) + (f/s) < -3.5$ and $-0.4 < (t/f) < -0.15$.

According to the present invention, it is possible to provide a good scanning linearity and a well corrected curvature of field by the single-piece scanning lens. Also, it is possible to form scanning spots on the image surface which provide not only high density but also uniform diameter of the scanning spots in the main scanning direction.

Still another object of the present invention is to provide a scanning lens for focusing a convergent light which is sent from a focusing lens along an optical axis and deflected at a substantially uniform angular velocity on a deflection surface of a deflector, so that a focused light is scanned on an image surface in a main scanning direction to form scanning spots thereon at a substantially uniform scanning rate, the scanning lens being made of a material with a refractive index n and constructed as a single lens having a focal length f, the scanning lens comprising a first surface with a first radius R1 of curvature and a second surface with a second radius R2 of curvature, a first relationship between the first and second radii R1 and R2 being represented to meet geometrical conditions of R1>0 and $R_1 < |R_2|$, the focusing lens having a first focal length s measured from a front principal point of the scanning lens to a virtual image surface the scanning lens having an entrance pupil distance t measured from the front principal point to the deflection surface, and a second relationship between the focal length f, the refractive index n, the first focal length s and the entrance pupil distance t being determined by the following formulas:

$$-8.0 < (nf/t) + (f/s) < -3.5$$

$$-0.4 < (t/f) < -0.15.$$

According to the present invention, it is possible to provide a well corrected curvature of field in the main scanning direction and at the same time a good scanning linearity.

Other objects and further features of the present invention will be apparent from the following detailed description when read in conjunction with the accompanying drawings.

DESCRIPTION OF THE PREFERRED EMBODIMENTS

First, a description will be given of a first embodiment of a scanning apparatus using a scanning lens according to the present invention, by referring to FIG. 1.

Figure 1:
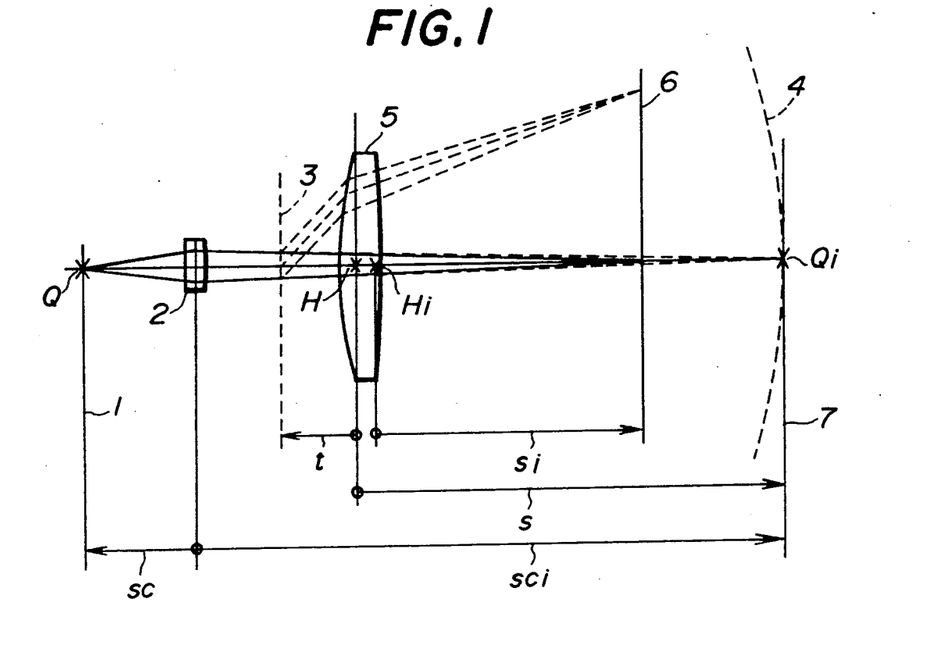
FIG. 1 is a schematic top view of an embodiment of a scanning apparatus using a scanning lens according to the present invention.

The scanning apparatus, as schematically shown in FIG. 1, comprises a light source device Q emitting a light, a focusing lens device 2 focusing the light emitted from the light source device Q into a focusing light, a deflector unit (not indicated) having a deflection surface 3 on which the focusing light from the focusing lens device 2 is deflected at a uniform angular velocity, and a scanning lens 5 for further focusing the deflected light from the deflection surface 3 so that a focused light is scanned by the deflector unit at a substantially uniform rate on an image surface 6 to form scanning spots on the image surface 6. A main scan of the light is made due to a rotation of the deflector unit in a main scanning direction, which is, in this case, made in a direction from top to bottom or vice versa within the place of FIG. 1 and parallel to the same plane. Also, a sub scan is made in a sub scanning direction, which is at right angles to the main scanning direction and perpendicular to the plane of FIG. 1.

A laser diode (LD) or a light emitting diode (LED) may be used as the light source device Q, and the scanning apparatus in this embodiment employs a laser diode as the light source device. It is assumed that a light source plane 1 perpendicular to an optical axis along which a light is emitted from the light source device Q is provided to pass through a light emitting part of the light source device Q. A diverging light emitted from the light source device Q is converted by a focusing lens as the focusing lens device 2 into a converging light, and the focusing light is deflected by the deflection surface 3 of the deflector unit to enter the scanning lens 5. As the deflector unit, a rotary polygonal mirror or a pyramidal mirror may be used. With no scanning lens 5 placed, a focusing light from the focusing lens 2 would converge at a normal focal point Qi on a virtual image surface 7 of the focusing lens 2. As the focusing light is deflected on the deflection surface of the deflector unit which is rotated, this focal point Qi of the focusing light traces a circular arc 4 as indicated in FIG. 1. When a rotary polygonal mirror is used as the deflector unit the beginning point of deflection changes slightly in location from the shown point on the optical axis, and the deflected light in this case does not draw accurately a perfect arc of a circle. But, the trace of the focal point Qi becomes a shape approximate to an arc of a circle.

The scanning lens 5 which is placed between the deflector surface 3 and the image surface 6 has a positive effect on refraction. Actually, the scanning lens 5 serves to focus the incoming light more convergingly so that a focused light is scanned on the image surface 6 to form scanning spots thereon in the main scanning direction, the image surface 6, as indicated, being nearer to the scanning lens 5 than the virtual image surface 7. In other words, the scanning lens 5 ideally has a function to connect the image surface 6 to an object position where a virtual light source with respect to the above discussed focusing light from the focusing lens 2 is located. This object position is moved on the trace 4 of the focal point Qi when the focusing light is deflected with the rotation of the deflector.

In the scanning lens 5 having a focal length f, as shown in FIG. 1, a first distance s measured in a direction indicated by an arrow from a front principal point H of the scanning lens 5 perpendicular to the virtual image surface 7, and a second distance si measured from a back principal point Hi of the scanning lens 5 perpendicular to the image surface 6 are represented by the following formula:

$$(1/s) - (1/si) = -1/f.$$

And, a distance t is measured in a direction indicated by an arrow in FIG. 1 from the front principal point H to the deflection surface 3 (entrance pupil). The scanning lens 5 is made of a material with a refractive index n. Algebraic signs of the distances s, si and t are in accordance with a rule of geometrical optics.

Figure 2A:
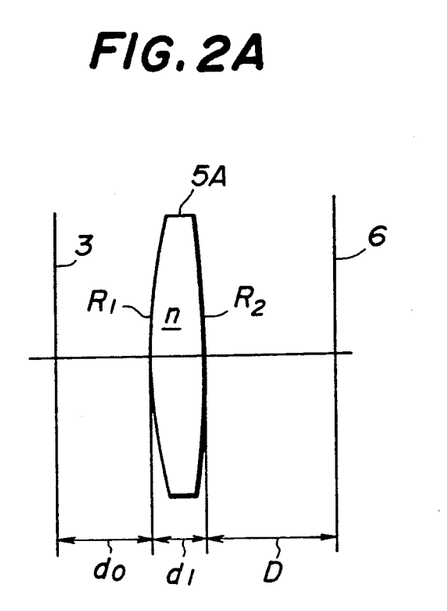
FIGS. 2A, 2B and 2C respectively are a schematic diagram for explaining a few examples of scanning lenses according to the present invention.
Figures 2B, 2C:
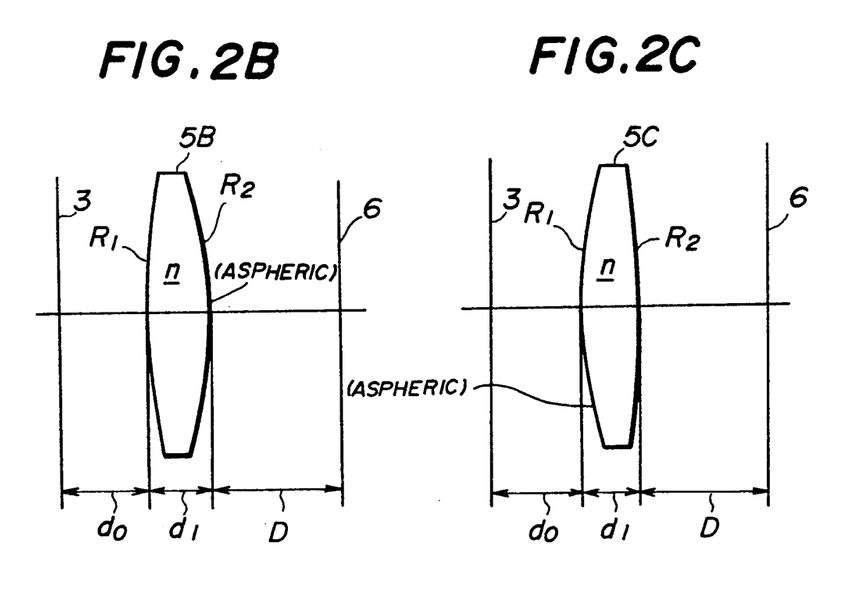

Referring next to FIGS. 2A, 2B and 2C, a description will be given of first, second and third embodiments of scanning lenses 5A, 5B and 5C according to the present invention, respectively. These scanning lenses serve to further focus a focusing light that is sent from the focusing lens 2 and deflected at a substantially uniform angular velocity on the deflection surface 3 of the deflector (not shown), so that a focused light is thrown on the image surface 6 to form scanning spots thereon. And these scanning lenses are made of a material with a refractive index n and constructed as a single lens having a focal length f. Each of the scanning lenses 5A, 5B and 5C has a first surface with a first radius R1 of curvature and a second surface with a second radius R2 of curvature. And, each of the scanning lenses has a thickness d1 along the optical axis, corresponding to a distance between the first and second surfaces. The deflection surface 3 of the deflector (not shown) is located at a distance d0 from the first surface, and the image surface 6 at a distance D from the second surface.

FIG. 2A shows a first example of the scanning lens 5A according to the present invention which comprises a first surface (on entrance side) with a first radius R1 of curvature and a second surface (on exit side) with a second radius R2 of curvature, a relationship between the first and second radii R1 and R2 being represented by conditions of R1>0 and R1>|R2|. The focusing lens 2 has a first focal length s measured from a front principal point of the scanning lens 5A to the virtual image surface 7, while the scanning lens 5A has an entrance pupil distance t measured from the front principal point to the reflection surface 3 of the reflector unit. And, a relationship between the focal length f, the refractive index n, the first focal length s and the entrance pupil distance t is determined by the following formulas:

$$-8.0 < (nf/t) + (f/s) < -3.5 \tag{1-I}$$

$$-0.4 < (t/f) < -0.15 \tag{1-II}$$

In the scanning lens 5A, the first surface is convex. But, as for the second surface, a form thereof is selectable from among a flat surface, a convex surface and a concave surface. Accordingly, the scanning lens 5A as shown in FIG. 2A can take the form of any one selected from among a convex-flat lens, convex-convex lens and a convex-concave lens (meniscus). The formula (1-I) described above is a condition which is necessary to make the diameters of the scanning spots being formed on the image surface 6 in the main scanning direction uniform. If the (nf/t)+(f/s) is smaller than the lower limit of −8.0 or greater than the upper limit of −3.5 as indicated in the formula (1-I), the curvature of field in the main scanning direction becomes worse, the scanning spots having varying widths in the main scanning direction formed on the image surface. If the (t/f) is smaller than the lower limit of −0.4 in the formula (1-II), the size of the scanning lens becomes too large, which will not meet the practical use. Exceeding the upper limit of −0.15 in the formula (1-II) causes the linearity to worsen, and, in such a case, a deviation from the uniform scanning speed becomes such a level that cannot be corrected by electric signal processing sufficiently to obtain a desired scanning linearity. Accordingly, the scanning lens 5A according to the present invention makes it possible to scan a focused light at a substantially uniform scanning speed within the range in which a deviation from the uniform scanning speed can be corrected by electric signal processing sufficiently.

FIG. 2B shows the second embodiment of the scanning lens 5B according to the present invention. The scanning lens 5B comprises a first surface with a first radius R1 of curvature and a second aspherical surface with a second radius R2 of curvature around the optical axis. In this respect, the radius of curvature around the optical axis described herein means a radius of a sphere in contact with the lens surface at a point where the optical axis intersects the lens surface. A relationship between the first and second radii R1 and R2 is represented by conditions of R2<0 and |R1|>|R2|. In FIG. 2B, those parts which are the same as those corresponding parts in FIG. 2A are designated by the same reference numerals and characters, and a description thereof will be omitted. A relationship between the focal length f, the refractive index n, the first focal length s and the entrance pupil distance t is represented by the following formulas:

$$-7 < (nf/t) + (f/s) < -0.6 \tag{2-I}$$

$$-0.4 < (t/f) < -0.13 \tag{2-II}$$

And the second aspherical surface is defined with the following relationship between a conical factor K and a fourth-order aspheric factor $A_4$ with respect to the second aspherical surface:

$$0.8 \times 10^{-8} < (A_4/K) < 3.0 \times 10^{-8} \tag{2-III}$$

In this concern, an aspherical surface generally can be defined as a curved plane that is formed when a curved line rotates around an optical axis. This curved line is given by the following mathematical expression:

$$x = y^2/[R + \sqrt{R^2 - (1+K)y^2}] + A_2y^2 + A_3y^3 + A_4y^4 + A_5y^5 + \ldots \tag{A}$$

In this mathematical equation, x is an aspheric quantity, y is a distance from the optical axis, and R is a radius of curvature with respect to the optical axis. The conical factor K in the (2-III) above is the same as in the above equation (A), and the fourth-order aspheric factor $A_4$ in the (2-III) above is the coefficient of $y^4$ in the above equation (A).

In the scanning lens 5B, the second aspherical surface is convex. As for the first surface, a form thereof is selectable from among a flat surface, a convex surface and a concave surface. Accordingly, the scanning lens 5B shown in FIG. 2B can take the form of any one selected from among a flat-convex lens, a convex-convex lens and a concave-convex lens (meniscus). The formulas (2-I) and (2-III) described above are a condition which is necessary for making the diameters of scanning spots in the main scanning direction uniform, with the changes of the spot diameters in the main scanning direction minimized. If the (nf/t)+(f/s) is smaller than the lower limit of −7 or greater than the upper limit of −0.6 indicated in the formula (2-I), the curvature of field in the main scanning direction becomes worse, the scanning spots having varying diameters in the main scanning direction being formed on the image surface 6. And, if the ($A_4$/K) is smaller than the lower limit of $0.8 \times 10^{-8}$ or greater than the upper limit of $3.0 \times 10^{-8}$ indicated in the (2-III), the curvature of field in the main scanning direction becomes worse. If the (t/f) is smaller than the lower limit in the formula (2-II), the size of the scanning lens becomes too large, which will not meet the practical use. Exceeding the upper limit in the formula (2-II) causes the scanning linearity to worse, and, in such a case, a deviation from the uniform scanning speed cannot be corrected by electric signal processing sufficiently to obtain a desired level of the scanning linearity.

FIG. 2C shows the third embodiment of the scanning lens 5C according to the present invention. The scanning lens 5C comprises a first aspherical surface with a first radius R1 of curvature around the optical axis and a second surface with a second radius R2 of curvature, a first relationship between the first and second radii R1 and R2 being represented by geometrical conditions of R1>0 and R1<|R2|, and a second relationship between the focal length f, the refractive index n, the first focal length s and the entrance pupil distance t being determined by the following formulas:

$$-8 < (nf/t) + (f/s) < -3.5 \tag{3-I}$$

$$-0.4 < (t/f) < -0.15 \tag{3-II}$$

In these formulas, those letters that are the same as those corresponding letters in the above formulas (2-I) and (2-II) are designated by the same letters, and a description thereof is omitted. And, the first aspherical surface of the scanning lens 5 is defined by the above described equation (A) with the following relationship between a conical factor K and a fourth aspheric factor $A_4$ with respect to the first aspherical surface:

$$0.6 \times 10^{-8} < (A_4/K) < 3.0 \times 10^{-8} \tag{3-III}$$

In the scanning lens 5C, the first aspherical surface is convex. As for the second surface, a form of this surface is selectable from among a flat surface, a convex surface and a concave surface. Accordingly, the scanning lens 5C as shown in FIG. 2C can take the form of any one selected from among a convex-flat lens, convex-convex lens and a convex-concave lens (meniscus). The formulas (3-I) and (3-III) described above are a condition which is necessary to make the diameters of the scanning spots being formed on the image surface 6 in the main scanning direction uniform. If the (nf/t)+(f/s) is smaller than the lower limit of −8 or greater than the upper limit −3.5 as indicated in the formula (3-I), the scanning spots having varying widths in the main scanning direction may be produced. And, if the ($A_4$/K) is smaller than the lower limit of $-0.6 \times 10^{-8}$ or greater than the upper limit of $-0.3 \times 10^{-8}$ as indicated in the (3-III), the scanning spots having varying widths in the main scanning direction may be formed. Thus, exceeding the limits as indicated in the (3-I) and (3-III) causes the curvature of field to increase, so that the uniformity of diameter of the scanning spots in the main scanning direction cannot be ensured. If the (t/f) is smaller than the lower limit of −0.4 in the formula (3-II) causes the size of the scanning lens becomes too large, which will not meet the practical use. Exceeding the upper limit of −0.15 in the formula (3-II) causes the linearity to worsen, and, in such a case, a deviation from the uniform scanning speed becomes such a level that cannot be corrected by electric signal processing sufficiently to obtain a desired scanning linearity.

Next, a description will be given of a few examples of the first embodiment of the scanning lens 5A shown in FIG. 2A, which may be used in the first embodiment of the scanning apparatus as shown in FIG. 1. In the following description, X, Y and Z denote the (nf/t)+(f/s) in the formulas (1-I), (2-I) and (3-I), the (t/f) in the formulas (1-II), (2-II) and (3-II) and the ($A_4$/K) in the formulas (2-III) and (3-III), respectively.

EXAMPLE I

| f = 326.349, s = 160, t = −70, | | | | | |
|---|---|---|---|---|---|
| X = −6.19, Y = −0.214, | | | | | |
| R1 | R2 | d0 | d1 | D | n |
| 250 | ∞ | 70 | 20 | 93.538 | 1.766 | max. total deflection angle: 80 deg.
scanning width: 217.1
linearity: 7.7% max.

Figure 4:
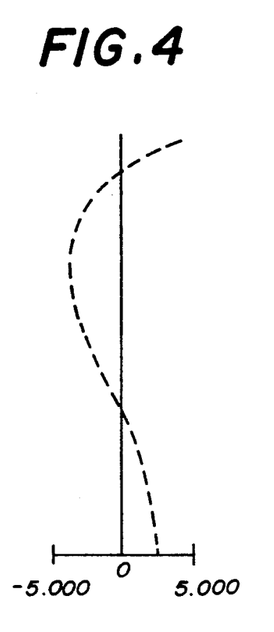
FIGS. 4, 5 and 6 respectively are a diagram showing a curvature of field in the main scanning direction regarding the examples I, II and III of the scanning lenses.

This example is a convex-flat lens in which the first surface is convex and the second surface is flat. FIG. 4 shows a curvature of field in the main scanning direction when the scanning lens of the example I is used.

EXAMPLE II

| f = 430.157, s = 103.732, t = −66.268, | | | | | |
|---|---|---|---|---|---|
| X = −7.32, Y = −0.154, | | | | | |
| R1 | R2 | d0 | d1 | D | n |
| 250 | 1000 | 70 | 20 | 66.65 | 1.766 | max. total deflection angle: 85 deg.
scanning width: 217.1
linearity: 18.2% max.

Figure 5:
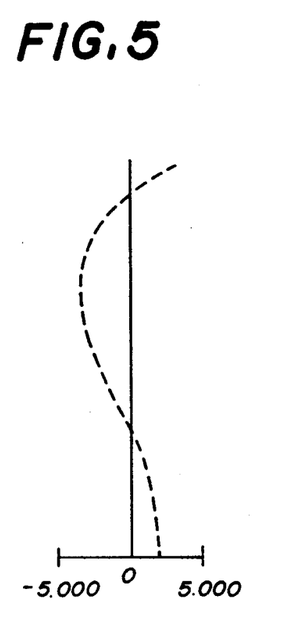

This example is a convex-concave lens in which the first surface is convex and the second surface is concave. FIG. 5 shows a curvature of field in the main scanning direction when the scanning lens of the example II is used.

EXAMPLE III

| f = 221.408, s = 214.238, t = −75.762, | | | | | |
|---|---|---|---|---|---|
| X = −4.13, Y = −0.342, | | | | | |
| R1 | R2 | d0 | d1 | D | n |
| 250 | −500 | 70 | 30 | 97.357 | 1.766 | max. total deflection angle: 90 deg.
scanning width: 217.1
linearity: 32.2% max.

Figure 6:
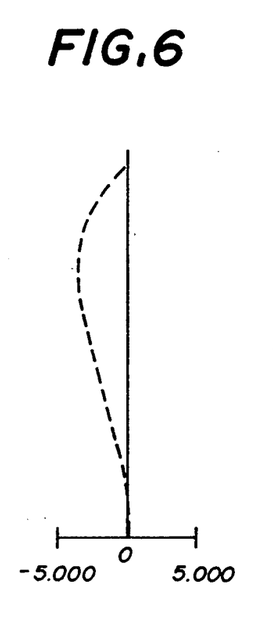

This example is a convex-convex lens in which both the first and second surfaces are convex. FIG. 6 shows a curvature of field in the main scanning direction when the scanning lens of the example III is used. As shown, the above described three examples I, II and III show a well corrected curvature of field in the main scanning direction, but exhibits a relatively large amount of the curvature of field in the sub scanning direction. To correct well the curvature of field in the sub scanning direction, the use of a correction lens device in the scanning apparatus is effective, which will be described below in greater detail.

Figure 3:
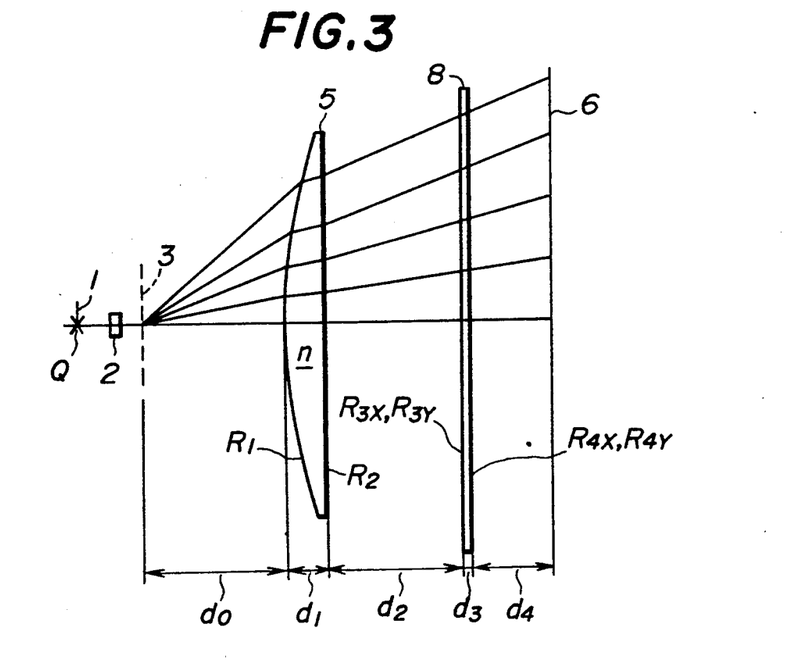
FIG. 3 is a schematic top view of another embodiment of a scanning apparatus using a scanning lens according to the present invention.

Next, a description will be given of a to the present invention, by referring to FIG. 3. In FIG. 3, those parts which are the same parts as those corresponding parts in FIG. 1 are designated by the same reference numerals, and a description thereof will be omitted. Provided between the scanning lens 5 and the image surface 6 of the scanning apparatus as shown in FIG.3 is a long size cylindrical lens 8 which used as the correction lens device for correcting the curvature of field in the sub scanning direction. The long size cylindrical lens 8 is made of a material with a refractive index n1, and has an entrance surface with a radius R3x of curvature in the main scanning direction and a radius R3y of curvature in the sub scanning direction, and an exit surface with a radius R4x of curvature in the main scanning direction and a radius R4y of curvature in the sub scanning direction. The long size cylindrical lens 8 shows a focal length fx in the main scanning direction and a focal length fy in the sub scanning direction and has a thickness d3. And, the scanning lens 5, the image surface 6 and the long size cylindrical lens 8 are placed in the scanning apparatus shown in FIG.3 so that the second surface (exit side) of the scanning lens 5 is at a distance d2 measured from the entrance surface of the cylindrical lens 8, the exit surface of the cylindrical lens 8 at a distance d4 measured from the image surface 6. The following is an example of the second embodiment of the scanning apparatus shown in FIG. 3.

EXAMPLE IV

| f = 326.349, s = 160, t = −70, | | | | | | | | | | | |
|---|---|---|---|---|---|---|---|---|---|---|---|
| X = −6.19, Y = −0.214, | | | | | | | | | | | |
| R1 | R2 | d0 | d1 | n | R3x | R3y | R4x | R4y | n1 | d2 | d3 | d4 |
| 250 | ∞ | 70 | 20 | 1.766 | ∞ | 12.0 | ∞ | ∞ | 1.485 | 67.0 | 3.0 | 24.518 | fx = ∞, fy = 24.742 max. total deflection angle: 80 deg.
scanning width: 217.1
linearity: 7.6% max.

Figure 7:
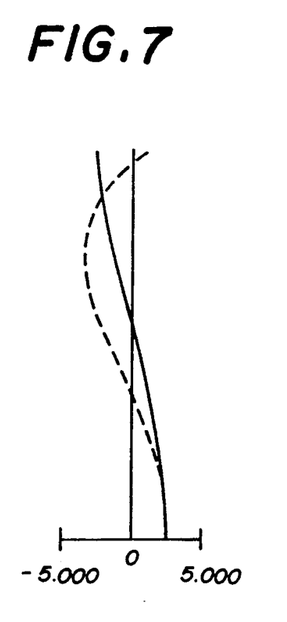
FIG. 7 is a diagram showing a curvature of field both in the main and sub scanning directions regarding the example IV of the scanning apparatus.

FIG. 7 shows curvatures of field both in the main scanning direction and in the sub scanning direction regarding the scanning lens of the example IV described above. The solid line in this drawing shows the curvature of field in the sub scanning direction, while the dotted line indicates the curvature of field in the main scanning direction. As in the case of the main scanning direction, the cylindrical lens 8 provides a well corrected curvature of field in the sub scanning direction.

Next, a description will be given of a few examples of the second embodiment of the scanning lens 5B as shown in FIG. 2B. These examples may be used in the first embodiment of the scanning apparatus as shown in FIG. 1. Concerning the second aspherical surface of the scanning lens 5B, all aspheric factors indicated in the above equation (A), other than the fourth-order aspheric factor $A_4$, are equal to zero.

EXAMPLE V

| f = 200, s = 300, t = −66.111, | | | | | |
|---|---|---|---|---|---|
| X = −4.78, Y = −0.33056, Z = 2.33 × 10⁻⁸ | | | | | |
| R1 | R2 | d0 | d1 | D | n |
| ∞ | −160.0 | 55 | 20 | 120 | 1.8 | aspheric factors: $K = -3.43$, $A_4 = -8.0 \times 10^{-8}$
max. deflection angle: 108 deg.
effective main scanning width: 286.0
linearity: 8% max.

Figure 8:
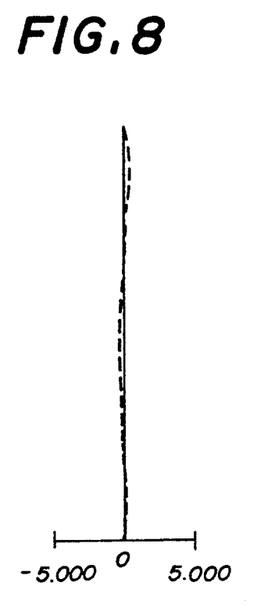
FIGS. 8, 9 and 10 respectively are a diagram showing a curvature of field in the main scanning direction regarding the examples V, VI and VII of the scanning lenses.

FIG. 8 shows a curvature of field in the main scanning direction regarding the scanning lens of the example. This example shows a relatively bad linearity, but a scanning linearity in this degree may be corrected by electric signal processing sufficiently to obtain a suitable level of the uniform scanning speed. With this degree of linearity, the curvature of field in the main scanning direction is corrected ideally, as shown in FIG. 8.

EXAMPLE VI

| f = 200, s = 301.811, t = −70.489, | | | | | |
|---|---|---|---|---|---|
| X = −4.44, Y = −0.35245, Z = 1.15 × 10⁻⁸ | | | | | |
| R1 | R2 | d0 | d1 | D | n |
| 800 | −197.778 | 61.5 | 20 | 118.067 | 1.8 | aspheric factors: $K = -4.0$, $A_4 = -4.6 \times 10^{-8}$
max. deflection angle: 85.6 deg.
effective main scanning width: 222.8
linearity: −1.4% to 2.5%

Figure 9:
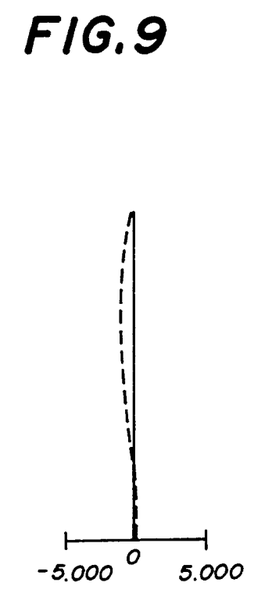

FIG. 9 shows a curvature of field in the main scanning direction regarding the scanning lens of the example VI.

EXAMPLE VII

| f = 200, s = 301.811, t = −70.489, | | | | | |
|---|---|---|---|---|---|
| X = −4.44, Y = −0.35245, Z = 1.0 × 10⁻⁸ | | | | | |
| R1 | R2 | d0 | d1 | D | n |
| 800 | −197.778 | 61.5 | 20 | 118.067 | 1.8 | aspheric factors: $K = -1.0$, $A_4 = -1 \times 10^{-8}$
max. deflection angle: 85.6 deg.
effective main scanning width: 222.0
linearity: −1.0% to 1.8%

Figure 10:
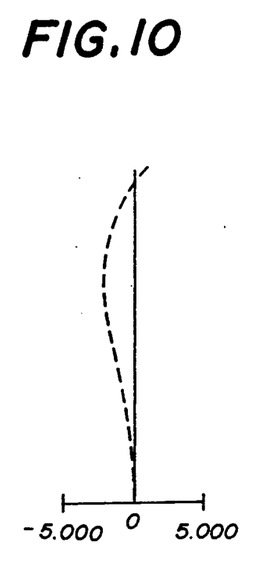

FIG. 10 shows a curvature of field in the main scanning direction regarding the scanning lens of the example VII. In the above described three examples V, VI and VII, the scanning lenses provide a well corrected curvature of field in the main scanning direction and allow a uniform diameter of scanning spots in the main scanning direction.

Figure 11:
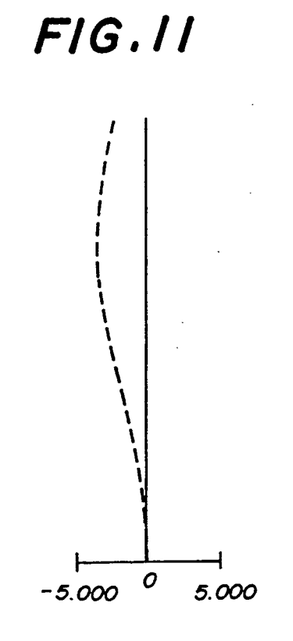
FIG. 11 is a diagram showing a curvature of field in the main scanning direction regarding a comparative example of a scanning lens.

For comparison, a comparative example of a scanning lens which has a first spherical surface and a second spherical surface with a linearity of −1.0% to 0.6% is shown in FIG. 11. Such a scanning lens having the first and second spherical surfaces with this order of linearity generally shows a curvature of field in the main scanning direction approximately in the same degree as that shown in FIG. 11. The linearity of this comparative example is approximately in the same degree as that of the example VII. The scanning lens of the example VII using an aspheric surface provides a well corrected curvature of field in the main scanning direction than that of this comparative example.

The above described three examples provide a well corrected curvature of field in the main scanning direction, but show a relatively great degree of curvature of field in the sub scanning direction. There are some methods for correcting the curvature of field in the sub scanning direction suitably without putting a negative influence on such allowable level of the curvature of field in the main scanning direction. One conceivable method is to use a correction lens device such as a long size cylindrical lens, a long size toroidal lens and the like for this purpose. Therefore, there is no problem in practical use of these scanning lenses.

Next, a description will be given of a few examples of the third embodiment of the scanning lens, as shown in FIG. 2C, which may be applied to the scanning apparatus shown in FIG. 1. Concerning the first aspheric surface of these examples of the scanning lenses, all aspheric factors, other than the fourth-order aspheric factor $A_4$, are equal to zero.

EXAMPLE VIII

| f = 326.349, s = 160, t = −70, | | | | | |
|---|---|---|---|---|---|
| X = −6.19, Y = −0.214, Z = −0.33 × 10⁻⁸ | | | | | |
| R1 | R2 | d0 | d1 | D | n |
| 250 | ∞ | 70 | 20 | 93.538 | 1.766 | aspheric factors: $K = -14.0$, $A_4 = 4.65 \times 10^{-8}$
max. deflection angle: 80 deg.
effective main scanning width: 223.6
linearity: 7.5% max.

Figure 12:
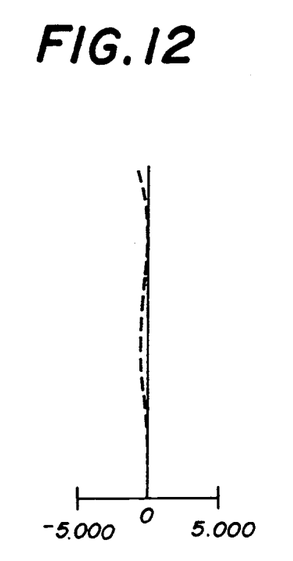
FIGS. 12, 13 and 14 respectively are a diagram showing a curvature of field in the main scanning direction regarding the examples VIII, IX and X of the optical scanning lenses.

FIG. 12 shows a curvature of field in the main scanning direction regarding the scanning lens of the example VIII. This example shows a relatively bad linearity, but, with this degree of linearity, the curvature of field in the main scanning direction can be corrected ideally, as shown in FIG. 12.

EXAMPLE IX

| f = 326.349, s = 160, t = −70, | | | | | |
|---|---|---|---|---|---|
| X = −6.19, Y = −0.214, Z = −0.4 × 10⁻⁸ | | | | | |
| R1 | R2 | d0 | d1 | D | n |
| 250 | ∞ | 70 | 20 | 93.538 | 1.766 |

| f = 326.349, s = 160, t = −70, |||||
| X = −6.19, Y = −0.214, Z = −0.4 × 10⁻⁸ |||||
| R1 | R2 | d0 | d1 | D | n |
|---|---|---|---|---|---|
| 250 | ∞ | 70 | 20 | 93.538 | 1.766 | aspheric factors: $K = -10$, $A_4 = 4.0 \times 10^{-8}$
max. deflection angle: 80 deg.
effective main scanning width: 221.4
linearity: −0.96% to 5.5%

Figure 13:
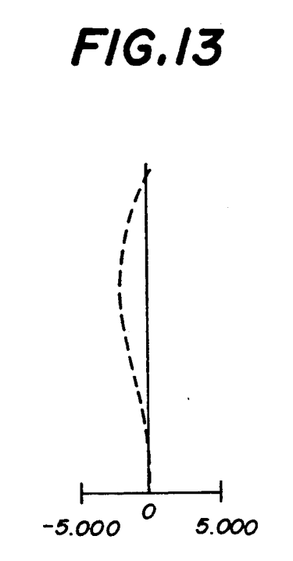

FIG. 13 shows a curvature of field in the main scanning direction regarding the scanning lens of the example IX.

EXAMPLE X

| f = 221.408, s = 214.238, t = −75.762, |||||
| X = −4.13, Y = −0.342, Z = −0.5 × 10⁻⁸ |||||
| R1 | R2 | d0 | d1 | D | n |
|---|---|---|---|---|---|
| 250 | −500 | 70 | 30 | 97.357 | 1.766 | aspheric factors: $K = -7.0$, $A_4 = 3.5 \times 10^{-8}$
max. deflection angle: 88 deg.
effective main scanning width: 216.4
linearity: 27.4% max.

Figure 14:
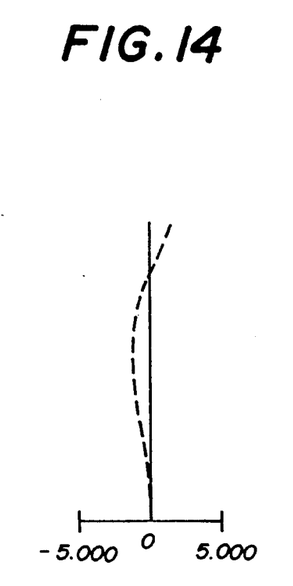

FIG. 14 shows a curvature of field in the main scanning direction regarding the scanning lens of the example X. The linearity is relatively great, but such a degree of deviation from uniformity of scanning speed may be corrected by electric signal processing sufficiently to obtain a desired linearity.

Figure 15:
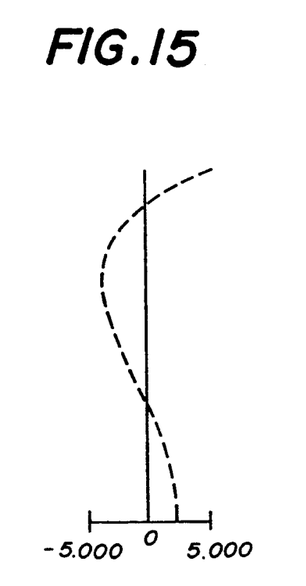
FIG. 15 is a diagram showing a curvature of field in the main scanning direction regarding another comparative example of a scanning lens.

The above described three examples VIII, IX and X provide a good correction of the curvature of field in the main scanning direction and produce efficiently a uniform diameter of scanning spots in the main scanning direction. For comparison, a comparative example of a scanning lens which has a first spherical surface and a second spherical surface with a linearity of −1.1% to 0.6% is given to show the curvature of field in the main scanning direction which is indicated in FIG. 15. Such a scanning lens having the first and second spherical surfaces with this degree of linearity generally shows a curvature of field in the main scanning direction approximately in the same degree as that shown in FIG. 15. The linearity of this comparative example is approximately in the same degree as that of the example IX. The scanning lens of the example IX which employs an aspheric surface provides a well corrected curvature of field in the main scanning direction than that of this comparative example.

The above described three examples of the scanning lenses provide a well corrected curvature of field in the main scanning direction, but show a relatively great degree of the curvature of field in the sub scanning direction. By using a correction lens device such as a long size cylindrical lens or a long size toroidal lens in the scanning apparatus, it is possible to correct the curvature of field in the sub scanning direction suitably without putting a negative influence on such allowable level of the curvature of field in the main scanning direction. Accordingly, there is no problem in practical use of these scanning lenses.

Further, the present invention is not limited to these embodiments, but various variations and modifications may be made without departing from the scope of the present invention.

What is claimed is:

1. A scanning apparatus comprising:

light source means for emitting a light along an optical axis;

focusing lens means for converting the light emitted from the light source means into a convergent light;

deflection means for deflecting the convergent light from the focusing lens means so that a deflected light is scanned at a substantially uniform angular velocity on an image surface, said deflection means having a deflection surface on which the convergent light is deflected; and scanning lens means for focusing the deflected light from the deflection means so that a focused light is scanned on the image surface in a main scanning direction to form scanning spots thereon at a substantially uniform scanning rate, said scanning lens means being made of a material with a refractive index n and constructed as a single lens having a focal length f, said scanning lens means comprising a first surface with a first radius R1 of curvature and a second surface with a second radius R2 of curvature, a first relationship between the first radius R1 and the second radius R2 being represented by geometrical conditions of R1>0 and R1<|R2|, said scanning lens means having a first focal length s measured from a front principal point of the scanning lens means to a first image surface, said scanning lens means having an entrance pupil distance t measured from the front principal point to the deflection surface of the deflection means, a second relationship between the focal length f, the refractive index n, the first focal length s and the entrance pupil distance t being determined by the following formulas:

$$-8.0 < (nf/t) + (f/s) < -3.5$$
   $$-0.4 < (t/f) < -0.15$$

2. A scanning apparatus as claimed in claim 1, wherein said scanning apparatus further comprises correction lens means provided between the scanning lens means and the image surface for correcting a curvature of field in a sub scanning direction, said correction lens means being a long size cylindrical lens.

3. A scanning apparatus as claimed in claim 1, wherein said scanning apparatus further comprises correction lens means provided between the scanning lens means and the image surface for correcting a curvature of field in a sub scanning direction.

4. A scanning apparatus comprising:

light source means for emitting a light along an optical axis;

focusing lens means for converting the light emitted from the light source means into a convergent light;

deflection means for deflecting the convergent light from the focusing lens means so that a deflected light is scanned at a substantially uniform angular velocity on an image surface, said deflection means having a deflection surface on which the convergent light is deflected; and scanning lens means for focusing the deflected light from the deflection means so that a focused light is scanned on the image surface in a main scanning direction to form a spot thereon at a substantially uniform scanning rate, said scanning lens means being made of a material with a refractive index n and constructed as a single lens having a focal length f, said scanning lens means comprising a first spherical surface with a first radius R1 of curvature and a second aspherical surface with a second radius R2 of curvature around the optical axis, a first relationship between the first radius R1 and the second radius R2 being represented by geometrical conditions of R2>0 and $|R1|<|R2|$, said scanning lens means having a first focal length s measured from a front principal point of the scanning lens means to a first image surface, said scanning lens means having an entrance pupil distance t measured from the front principal point to the deflection surface of the deflection means, a second relationship between the focal length f, the refractive index n, the first focal length s and the entrance pupil distance t being represented by the following formulas:

$$-7 < (nf/t) + (f/s) < -0.6$$

$$-0.41 < (t/f) < -0.13$$

and said second aspherical surface being defined by a curved plane formed when a curved line rotates around an optical axis according to the following predetermined mathematical equation:

$$x = y^2/(R + \sqrt{R^2 - (1+K)y^2}) + A_2 y^2 + A_3 y^3 + A_4 y^4 + A_5 y^5 + \ldots$$

wherein x is an aspheric quantity, y is a distance from the optical axis, R is a radius of curvature with respect to the optical axis, K is a conical factor, and $A_2$ to $A_5$ are first to fourth aspheric factors, having the following third relationship between K and $A_4$ with respect to the second aspherical surface:

$$0.6 \times 10^{-8} < (A_4/K) < 3.0 \times 10^{-8}$$

5. A scanning apparatus as claimed in claim 4, wherein said scanning apparatus further comprises correction lens means provided between the scanning lens means and the image surface for correcting a curvature of field in a sub scanning direction, said correction lens means being a long size cylindrical lens.

6. A scanning apparatus as claimed in claim 4, wherein said scanning apparatus further comprises correction lens means provided between the scanning lens means and the image surface for correcting a curvature of field in a sub scanning direction.

7. A scanning apparatus comprising:
light source means for emitting a light along an optical axis;
focusing lens means for converting the light emitted from the light source means into a convergent light;
deflection means for deflecting the convergent light from the focusing lens means so that a deflected light is scanned at a substantially uniform angular velocity on an image surface, said deflection means having a deflection surface on which the convergent light is deflected; and
scanning lens means for focusing the deflected light from the deflection means so that a focused light is scanned on the image surface in a main scanning direction to form a spot thereon at a substantially uniform scanning rate, said scanning lens means being made of a material with a refractive index n and constructed as a single lens having a focal length f, said scanning lens means comprising a first aspherical surface with a first radius R1 of curvature around the optical axis and a second spherical surface with a second radius R2 of curvature, a first relationship between the first radius R1 and the second radius R2 being represented by geometrical conditions of R1>0 and $R1<|R2|$, said scanning lens means having a first focal length s measured from a front principal point of the scanning lens means to a first image surface, said scanning lens means having an entrance pupil distance t measured from the front principal point to the deflection surface of the deflection means, a second relationship between the focal length f, the refractive index n, the first focal length s and the entrance pupil distance t being determined by the following formulas:

$$-8 < (nf/t) + (f/s) < -3.5$$

$$-0.4 < (t/f) < 0.15$$

and said first aspherical surface being defined by a curved plane formed when a curved line rotates around an optical axis according to the following predetermined mathematical equation:

$$x = y^2/(R + \sqrt{R^2 - (1+K)y^2}) + A_2 y^2 + A_3 y^3 + A_4 y^4 + A_5 y^5 + \ldots$$

wherein x is an aspheric quantity, y is a distance from the optical axis, and R is a radius of curvature with respect to the optical axis, K is a conical factor, and $A_2$ to $A_5$ are first to fourth aspheric factors, having the following third relationship between K and $A_4$ with respect to the first aspherical surface:

$$-0.6 \times 10^{-8} < (A_4/K) < -0.3 \times 10^{-8}.$$

8. A scanning apparatus as claimed in claim 7, wherein said scanning apparatus further comprises correction lens means provided between the scanning lens means and the image surface for correcting a curvature of field in a sub scanning direction, said correction lens means being a long size cylindrical lens.

9. A scanning apparatus as claimed in claim 7, wherein said scanning apparatus further comprises correction lens means provided between the scanning lens means and the image surface for correcting a curvature of field in a sub scanning direction.

10. A scanning lens for focusing a convergent light which is sent from a focusing lens along an optical axis and deflected at a substantially uniform angular velocity on a deflection surface of a deflector, so that a focused light is scanned on an image surface in a main scanning direction to form scanning spots thereon at a substantially uniform scanning rate, said scanning lens being made of a material with a retractive index n and constructed as a single lens having a focal length f, said scanning lens comprising a first surface with a first radius R1 of curvature and a second surface with a second radius R2 of curvature, a first relationship between the first radius R1 and the second radius R2 being represented by geometrical conditions of R1 >0 and $|R1> |R2|$, said scanning lens having a first focal length s measured from a front principal point of the scanning lens to a first image surface, said scanning lens having an entrance pupil distance t measured from the front principal point to the deflection surface, and a second relationship between the focal length f, the refractive index n, the first focal length s and the entrance pupil distance t being determined by the following formulas:

$$-8.0<(nf/t)+(f/s)<-3.5$$

$$-0.4<(t/f)<-0.15.$$

11. A scanning lens for focusing a convergent light which is sent from a focusing lens along an optical axis and deflected at a substantially uniform angular velocity on a deflection surface of a deflector, so that a focused light is scanned on an image surface in a main scanning direction to form a spot thereon at a substantially uniform scanning rate, said scanning lens being made of a material with a refractive index n and constructed as a single lens having a focal length f, said scanning lens comprising: a first spherical surface with a first radius R1 of curvature and a second aspherical surface with a second radius R2 of curvature around the optical axis, a first relationship between the first radius R1 and the second radius R2 being represented by geometrical conditions of R2<0 and $|R1|>|R2|$, said scanning lens having a first focal length s measured from a front principal point of the scanning lens to a first image surface, said scanning lens having an entrance pupil distance t measured from the point principal point to the deflection surface, a second relationship between the focal length f, the refractive index n, the first focal length s and the entrance pupil distance t being represented by the following formulas:

$$-7<(nf/t)+(f/s)<-0.6$$

$$-0.41<(t/f)<-0.13$$

and said second aspherical surface being defined by a curved plane formed when a curved line rotates around an optical axis according to the following predetermined mathematical equation:

$$x = y^2/(R + \sqrt{R^2 - (1 + K)y^2}) + A_2y^2 + A_3y^3 + A_4y^4 + A_5y^5 + \ldots$$

wherein x is an aspheric quantity, y is a distance from the optical axis, and R is a radius of curvature with respect to the optical axis, K is a conical factor, and $A_2$ to $A_5$ are first to fourth aspheric factors, having the following third relationship between K and $A_4$ with respect to the second aspherical surface:

$$0.8\times10^{-8}<(A_4/K)<3.0\times10^{-8}.$$

12. A scanning lens for focusing a convergent light which is sent from a focusing lens along an optical axis and deflected at a substantially uniform angular velocity on a deflection surface of a deflector, so that a focused light is scanned on an image surface in a main scanning direction to form a spot thereon at a substantially uniform scanning rate, said scanning lens being made of a material with a refractive index n and constructed as a single lens having a focal length f, said scanning lens comprising: a first aspherical surface with a first radius R1 of curvature around the optical axis and a second spherical surface with a second radius R2 of curvature, a first relationship between the first radius R1 and the second radius R2 being represented by geometrical conditions of R1>0 and $R1>|R2|$, said scanning lens having a first focal length s measured from a front principal point of the scanning lens to a first image surface, said scanning lens having an entrance pupil distance t measured from the front principal point to the deflection surface, a second relationship between the focal length f, the refractive index n, the first focal length s and the entrance pupil distance t being determined by the following formulas:

$$-8<(nf/t)+(f/s)<-3.5$$

$$-0.4<(t/f)<-0.15,$$

and said fist aspherical surface being defined by a curved plane formed when a curved line rotates around an optical axis according to the following predetermined mathematical equation:

$$x = y^2/(R + \sqrt{R^2 - (1 + K)y^2}) + A_2y^2 + A_3y^3 + A_4y^4 + A_5y^5 + \ldots$$

wherein x is an aspheric quantity, y is a distance from the optical axis, and R is a radius of curvature with respect to the optical axis, K is a conical factor, and $A_2$ to $A_5$ are first to fourth aspheric factors, having the following third relationship between K and $A_4$ with respect to the first aspherical surface:

$$-0.6\times10^{-8}<(A_4/K)<-0.3\times10^{-8}.$$

* * * * *